United States Patent
Iwazaki et al.

(10) Patent No.: US 6,672,443 B2
(45) Date of Patent: Jan. 6, 2004

(54) ELECTROMAGNETIC FRICTION CONNECTING APPARATUS

(75) Inventors: Akihiro Iwazaki, Saitama (JP); Rikiya Kunii, Saitama (JP); Kenji Honda, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/198,124

(22) Filed: Jul. 19, 2002

(65) Prior Publication Data
US 2003/0047408 A1 Mar. 13, 2003

(30) Foreign Application Priority Data
Sep. 12, 2001 (JP) .................................. 2001-276031

(51) Int. Cl.[7] .............................................. F16D 27/115
(52) U.S. Cl. ............... 192/84.2; 192/84.91; 192/84.93; 192/84.96
(58) Field of Search ............................... 192/84.2, 84.9, 192/84.91, 84.93, 84.96, 84.961; 335/296, 299; 336/107, 192

(56) References Cited

U.S. PATENT DOCUMENTS

| | | | | |
|---|---|---|---|---|
| 5,250,921 A | * | 10/1993 | Van Laningham et al. | 335/296 |
| 5,320,206 A | * | 6/1994 | Maejima | 192/84.961 |
| 5,508,671 A | * | 4/1996 | Takashi | 335/296 |
| 5,967,282 A | * | 10/1999 | Takahashi | 192/84.961 |

FOREIGN PATENT DOCUMENTS

| JP | 2001-116063 | 4/2001 |
|---|---|---|
| JP | 2001-116813 | 4/2001 |

* cited by examiner

*Primary Examiner*—Richard M. Lorence
(74) *Attorney, Agent, or Firm*—Armstrong, Kratz, Quintos, Hanson & Brooks, LLP

(57) ABSTRACT

The object of the present invention is to provide an electromagnetic friction connecting apparatus, which allows the easier operations associated with the installation of an exciting coil or a search coil in a core element. Input and output terminals having second horizontal parts extending in the vehicle inward direction and second vertical parts extending from the ends of the second horizontal parts into the radial outward direction are provided for the exciting coil and the search coil. Each end of the second vertical parts is situated radially inside a periphery surface of the exciting coil. Holes which allow the respective ends of the second vertical parts of the input and output terminals to face the outside are made on the core element and the housing. They are connected to the ends of the second vertical parts of the input and output terminals by inserting couplers into these holes.

8 Claims, 6 Drawing Sheets

ELECTROMAGNETIC FRICTION CONNECTING APPARATUS

FIELD OF THE INVENTION

The present invention relates to an electromagnetic friction connecting apparatus such as an electromagnetic brake, an electromagnetic clutch and the like. It more particularly relates to the wiring structure for the exciting coil of an electromagnetic friction connecting apparatus, which is fixed in the housing of the driving force distribution unit of a vehicle.

BACKGROUND OF THE INVENTION

As a conventional electromagnetic clutch belonging to an electromagnetic friction connecting apparatus, an apparatus which engages a multiple dish clutch mechanism by actuating an armature element with the magnetic force generated by an exciting coil which is supplied with electricity has been known, which is disclosed in Japan Laid-Open Patent Publication 2001-116063. This electromagnetic clutch includes a ring-like core element, an exciting coil installed in the concave which is formed circumferentially on the core element and has an opening in an axial direction and the ring-like armature element which is so situated that it may cover the exciting coil. This electromagnetic clutch, which is utilized for a power distribution unit that is capable of distributing the engine driving power for the right and left wheels of a vehicle, is contained in the housing of the power distribution unit. Holes for guiding harness are made on the concave bottom of the core element and also holes for installing connectors are made on the housing, since the electricity for the exciting coil of the electromagnetic clutch is supplied externally through harnesses and connectors.

The structure described above has required that the exciting coil should be installed in the concave of the core element after connecting one end of the harness to the exciting coil and guiding the other end through the hole made on the core element, when the exciting coil of the electromagnetic clutch is installed in the concave of the core element. When the electromagnetic clutch is installed in the housing, the following steps have been requested: guiding the harness coming out of the hole of the core element through the housing hole, installing the core element in the housing, connecting the harness coming out of the housing hole to the connector and mounting this connector to the housing hole.

The electromagnetic clutch, which is disclosed in Japanese Laid-Open Patent Publication 2001-116813, has a search coil which detects the magnetic flux generated by the exciting coil. Another harness thus is required for transmitting the current of electromagnetic induction by this search coil, and thereby it is necessary to prepare a hole similar to that described above in an appropriate spot and install the search coil after guiding the harness through the hole.

SUMMARY OF THE INVENTION

The object of the present invention is to provide an electromagnetic friction connecting apparatus, which allows the easier operations associated with the installation of the exciting coil or the search coil in the core element.

The present invention to assess the problems according to claim 1 provides an electromagnetic friction connecting apparatus comprising; a core element which is formed into a ring shape with a U-shaped section and secured within a housing; at least one of an exciting coil and a search coil having ring-like shapes, which is situated within a concave of the U-shaped cross section of the core element; an armature element having a ring-like shape, which is disposed opposite to an opening side of the concave of the U-shaped cross section of the core element; a pressing element which is actuated by the armature element; and a multiple dish clutch mechanism on which the pressing element exerts connecting force, wherein a plurality of wiring terminals, each of the wiring terminals including a first extension, which extends in a direction of the armature element to press the pressing element, and a second extension, which extends outward radially from an end of the first extension, are provided in at least one of the exciting coil and the search coil, wherein an end of the second extension of the wiring terminal is situated radially inside a peripheral surface of the exciting coil, wherein a plurality of connection openings, each of which allows the end of the second extension of the wiring terminal of at least one of the exciting coil and the search coil to be exposed to an outside of the housing, are formed on the core element and the housing, and wherein a plurality of couplers, each of which has an electrical sending and receiving portion, are inserted into the openings to couple to the end of the second extension of the wiring terminal. "A radial direction" is defined here as a direction of radius such as that of a ring-like core element or an exciting coil. "Sending and receiving of electricity" means that an exciting coil, for example, receives electricity from an external power source, on the other hand a search coil sends the current induced by the magnetic force of the exciting coil. "An electromagnetic friction connecting apparatus" includes an apparatus which is capable of engaging a clutch mechanism by the electromagnetic force exerted by an electromagnetic clutch or an electromagnetic brake.

The invention according to claim 1 allows each of the wiring terminals of the exciting coil to be housed in the connection opening formed on the core element, when the exciting coil is installed in the concave of a U-shaped cross section of the core element. The end of the second extension of each wiring terminal will not interfere with the core element in which the exciting coil is installed, since it is situated radially inside the peripheral surface of the exciting coil. If the core element is secured in the housing aligning the connection openings of the core element with those of the housing, the end of the second extension of each wiring terminal faces the outside of the housing. The coupler is inserted into the connection opening so that it may be connected to the end of the second extension of each wiring terminal.

The invention according to claim 2 provides an electromagnetic friction connecting apparatus of claim 1 wherein the search coil is disposed so that a peripheral surface of the search coil is situated radially inside the first extension of the wiring terminal of the exciting coil, and the openings of the exciting coil and the search coil which are made on the core element and the housing are offset circumferentially.

"A circumferential direction" is defined as a direction of the circumference such as that of a ring-like core element or a ring-like exciting coil.

The invention according to claim 2 allows each of the wiring terminals of the search coil to be housed in the connection opening for the search coil formed on the core element in addition to the effects of claim 1, when the search coil is installed in the concave of a U-shaped section of the core element. Next the exciting coil is installed in the concave of a U-shaped cross section of the core element.

Each of the first extensions of the exciting coil will not interfere with the search coil since the outer peripheral surface of the search coil is situated radially inside each first extension of the wiring terminal of the exciting coil. The wiring terminals of the exciting coil and the search coil are free of interference since the connection openings for them are placed offset each other circumferentially. The search coil can thus be situated near the exciting coil.

The invention according to claim 3 or 4 provides an electromagnetic friction connecting apparatus of claim 1 or 2 respectively, wherein the housing is filled with a lubricant partially at least, seal elements of leak protection for the lubricant are provided for each of the couplers, and at least one of the connection openings for the exciting coil and the search coil is made in an upper half of the housing.

The invention according to claim 3 or 4 allows the couplers having seal elements to be inserted into the connection holes of the exciting coil and the search coil from above the housing, in addition to the effects achieved by claim 1 or 2.

The invention according to claim 5, 6, 7 or 8 provides an electromagnetic friction connecting apparatus of claim 1, 2, 3 or 4 respectively, wherein a peripheral portion of the armature element is so configured that a diameter of the peripheral portion is larger than an outer diameter of the core element, wherein the pressing element is formed cylindrically and one end of the pressing element is secured to the peripheral portion and the other end is coupled to a pressing plate of the clutch mechanism, wherein the pressing element is mated around the core element displaceably in a pressing direction, wherein the core element includes flanges located at a periphery thereof for fixing the core element to the housing, wherein a first plurality of cutouts for avoiding the flanges and a second plurality of cutouts for avoiding the couplers for at least one of the exciting coil and the search coil are provided on the pressing element, and wherein all the cutouts are positioned evenly in a circumferential direction.

The invention according to claim 5, 6, 7 or 8 provides a well-balanced axial displacement of the pressing element in addition to the effects achieved by the invention of claim 1, 2, 3 or 4 respectively, since all the cutouts of the pressing element are situated evenly in the circumferential direction.

DESCRIPTION OF THE PREFERRED EMBODIMENTS

Figure 1:
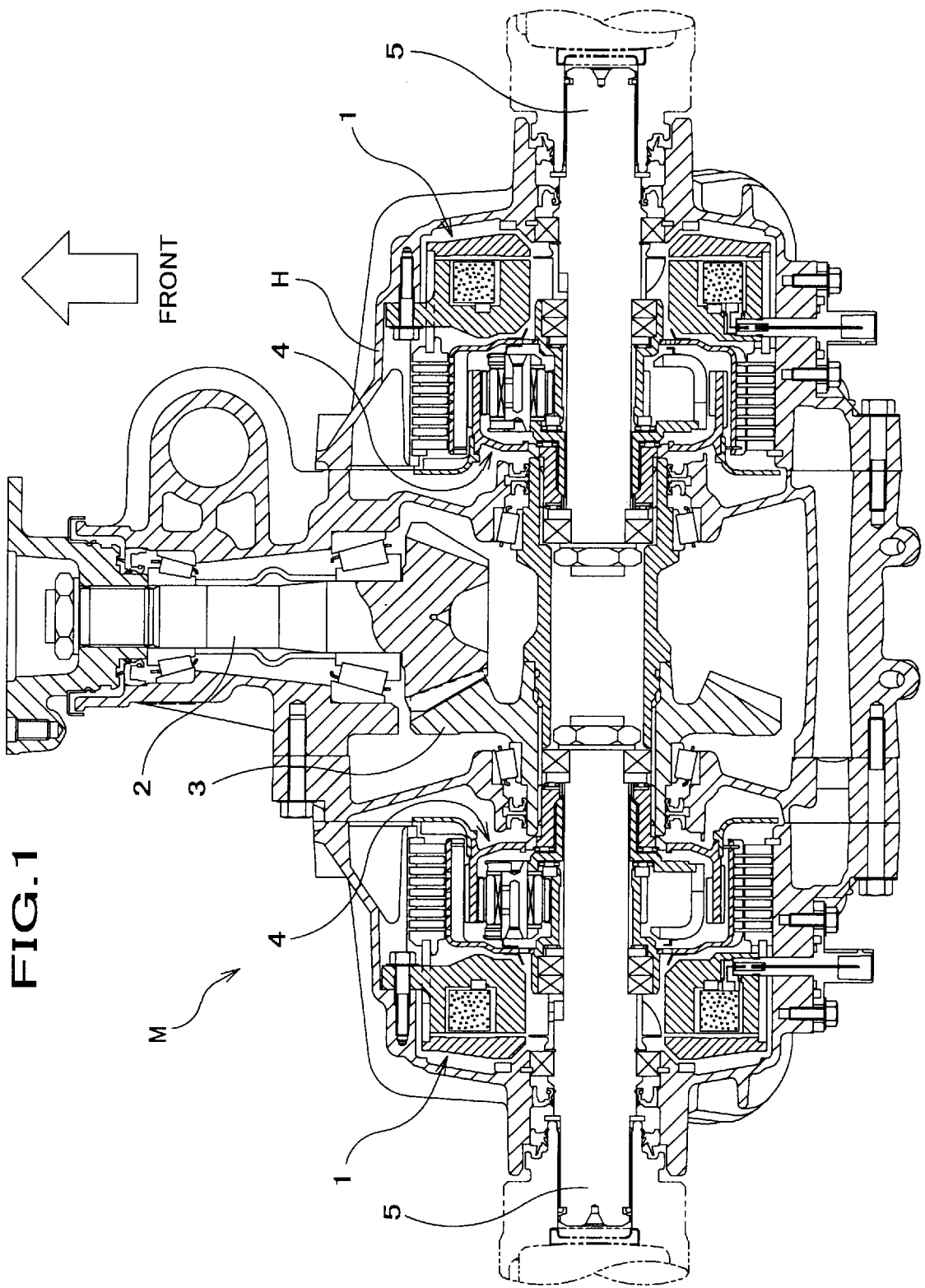
FIG. 1 is a sectional view showing the structure of the rear wheel differential unit of the four-wheel-drive vehicle based upon a front-engine-front-drive vehicle, to which the electromagnetic friction connecting apparatus according to the present invention is applied.

The details of the electromagnetic friction connecting apparatus according to the present invention will now be described referring to the drawings.

As shown in FIG. 1, the present invention is applied to a pair of electromagnetic brakes 1, which is fixed in a housing H of a rear differential unit M serving as a driving power distribution unit of a four-wheel-drive vehicle based on a front-engine-front wheel-drive vehicle, in the embodiment to be described.

As shown in FIG. 1, the rear differential unit M includes a transmission shaft 2 for transmitting the power of an engine (not shown) to the rear differential unit M, a gear 3 for altering the rotational direction of the transmission shaft 2, a pair of planetary gear mechanisms 4 driven by the gear 3 and the electromagnetic brakes (electromagnetic friction connecting apparatus) 1 for controlling the movement of the planetary gear mechanisms 4. The rear differential unit M can perform selection of the four-wheel-drive and the front-wheel-drive modes by ON-OFF switching of the electromagnetic brakes 1 and drive right and left rear drive shafts 5 adjustably by controlling the connecting force of each electromagnetic brake 1 as well.

Figure 2:
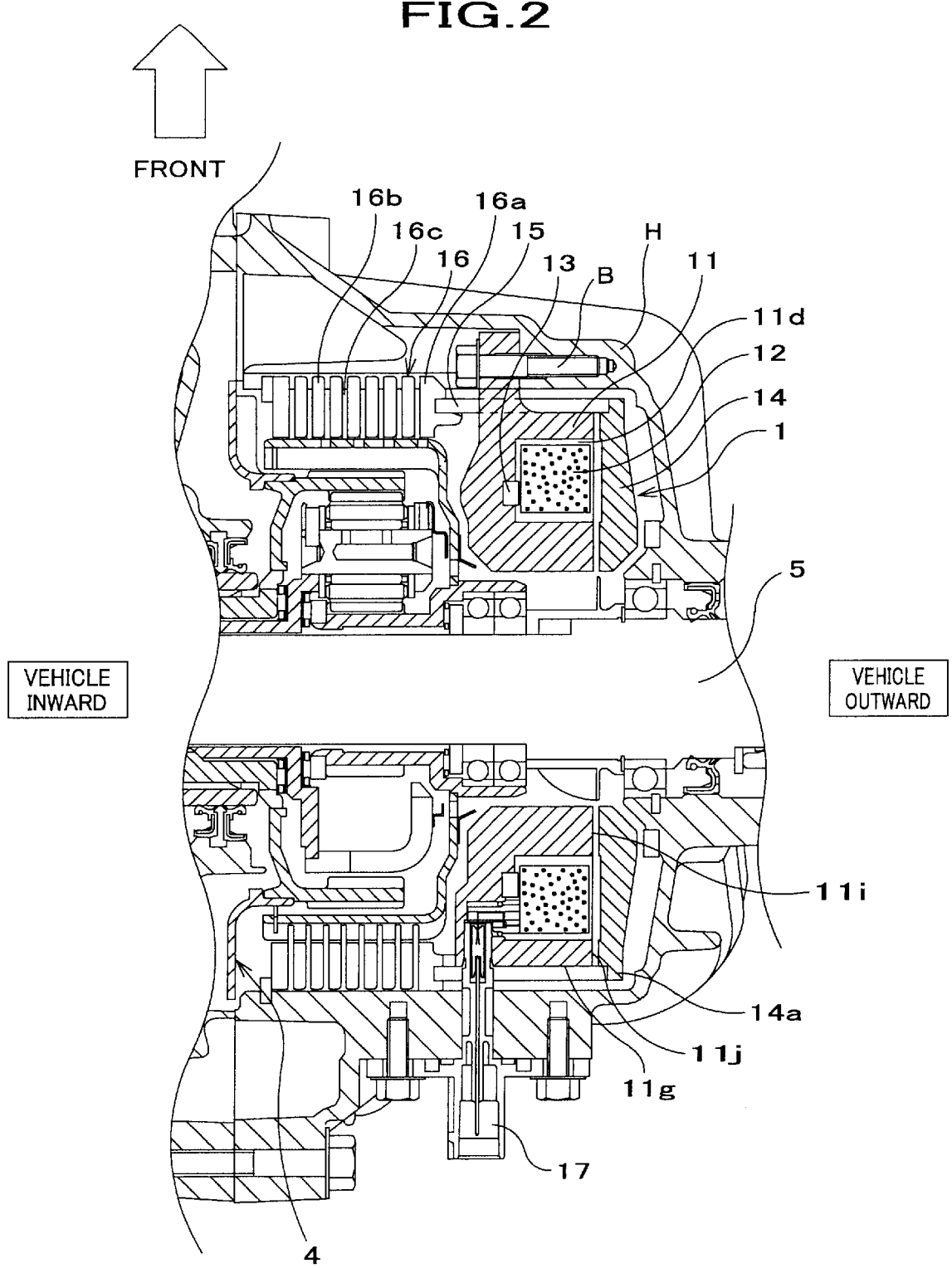
FIG. 2 is an enlarged section view showing the structure of the electromagnetic brake shown in FIG. 1.

As shown in FIG. 2, each of the electromagnetic brakes 1 includes a core element 11, an exciting coil 12 for generating the magnetic force by turning on electricity, a search coil 13 for detecting the magnetic flux of the exciting coil 12, an armature element 14 actuated by the magnetic force of the exciting coil 12, a pressing element 15 actuated by the armature element 14, a multiple dish clutch mechanism 16 on which the pressing element 15 exerts the engaging force and a pair of a first and a second couplers 17.

FIGS. 1 and 2 show the cross section where the core element 11 is fixed in the vehicle front side relative to the shaft line of the rear drive shafts 5 and another cross section where the first coupler 17 is fixed on the vehicle rear side relative to it.

Figure 3:
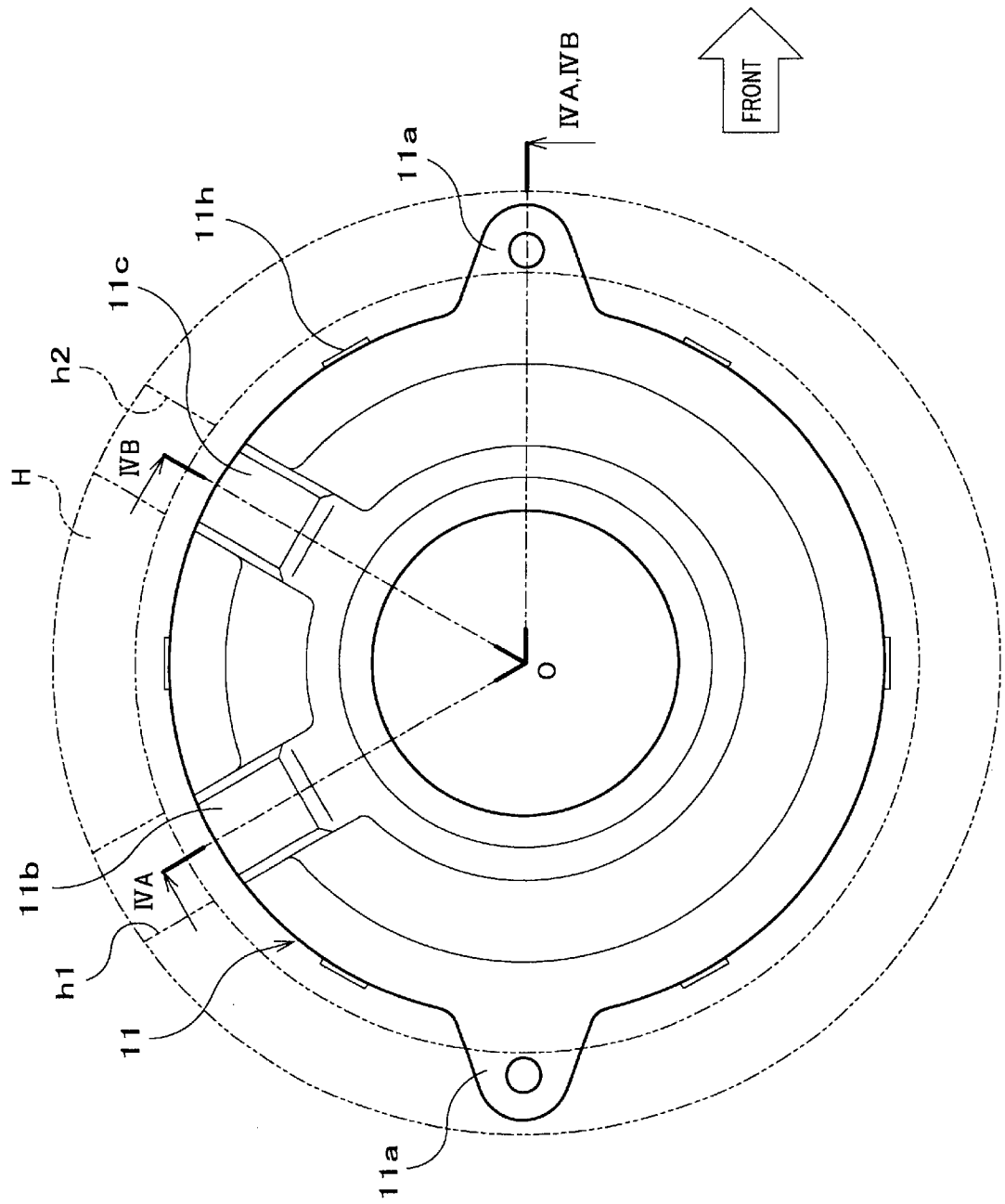
FIG. 3 is a front view showing the core element of the electromagnetic brake according to the present embodiment.

The core element 11, as shown in FIG. 3, is a ring-shaped element made of a magnetic material, which is coaxial with the rear drive shaft 5. Flanges 11a for fixing the core element 11 to the housing H are disposed at the periphery symmetrically with regard to the center of the core element 11. The flanges 11a are so arranged that they are located on the vehicle front and rear sides respectively when the core element 11 is fixed in the housing H. A hole for wiring the exciting coil 12 (connection opening for the exciting coil) 11b and a hole for wiring the search coil 13 (connection opening for the search coil) 11c are made on the preferred positions of the core element 11 which are situated in the upper half of the housing H. These holes 11b and 11c are located between the flanges 11a offsetting circumferentially at regular intervals. A hole (connection opening for the exciting coil) h1 and a hole (connection opening for the search coil) h2 are made on the upper half of the housing H, which correspond to the holes 11b and 11c of the core element 11, respectively.

Figure 4:
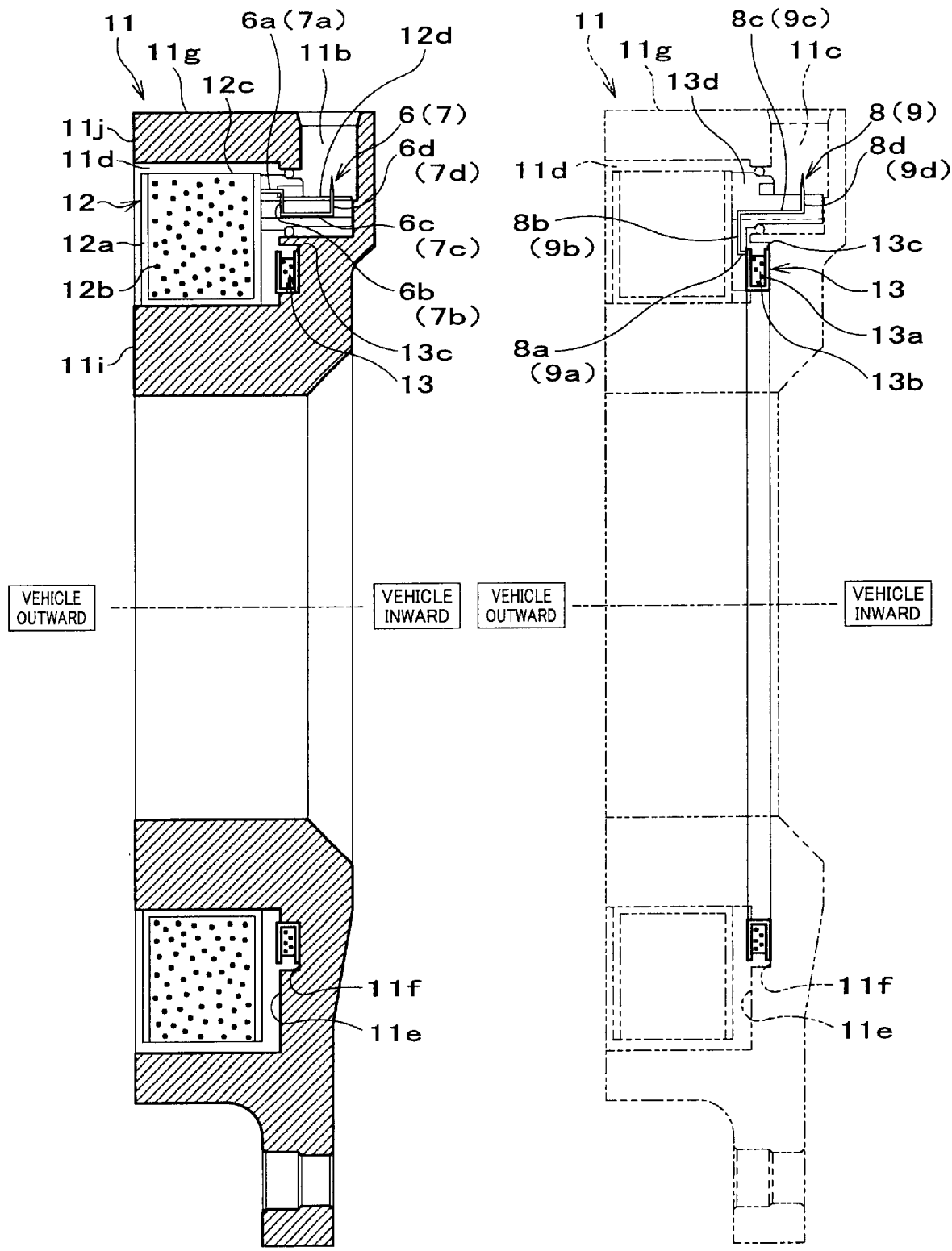
FIG. 4A is a sectional view taken along the line IVA—IVA in FIG. 3 showing the core element and the exciting coil according to the present embodiment.
FIG. 4B is a sectional view taken along the line IVB—IVB in FIG. 3 showing the search coil.

As shown FIG. 4A, a first concave (U-shaped cross section) 11d is formed circumferentially throughout on the core element 11, the opening of which is perpendicular to the axial direction. The exciting coil 12 is installed in the first concave 11d. Circumferentially throughout on a base 11e of the first concave 11d is formed a second concave (U-shaped cross section) 11f lying radially inward, in which the search coil 13 is installed. The hole 11b which is on a peripheral surface of the core element 11 communicates with the first concave 11*d* in a L-shaped cross section through the radially outward portion of the base 11*e*. Similarly the hole 11*c* also communicates with the first concave 11*d* in a L-shaped cross section. As shown on FIG. 3, six pieces of projections 11*h* are formed on the peripheral surface 11*g* of the core element 11 at regular intervals circumferentially. On the opening side of the concave 11*d* of the core element 11 shown in FIG. 4A, the width of a surface 11*i* lying radially inward is set to be larger than that of a surface 11*j* lying radially outward so that they may have the same area. The opening side of the concave 11*d* of the core element 11 will be called "vehicle outward" in the following descriptions, since it faces the vehicle outward when the core element 11 is fixed to the housing H. On the other hand, the opposite side will be called "vehicle inward".

The exciting coil 12, as shown in FIG. 4A, mainly includes a coil bobbin 12*a* formed like a ring by resins and a coil wiring 12*b* which is closely wound around the coil bobbin 12*a* in a given number of turns. Adjacent to a peripheral surface 12*c* of the exciting coil 12 on the vehicle inward side are disposed a pair of an input terminal (wiring terminal) 6 and an output terminal (wiring terminal) 7 neighboring each other. "The peripheral surface 12*c* of the exciting coil 12" is defined here as a surface which is situated at the most outward position radially between the peripheral surface of the coil bobbin 12*a* and that formed by the coil wiring 12*b*. One end of the coil wiring 12*b* is connected to the input terminal 6 and the other end of it is connected to the output terminal 7.

The input terminal 6 is made of one bent element so that it has a first horizontal part 6*a*, a first vertical part 6*b*, a second horizontal part (a first extension) 6*c* and a second vertical part (a second extension) 6*d*. One end of the first horizontal part 6*a* is connected to the vehicle inward and radially outward surface of the coil bobbin 12*a* and the other end extends toward the vehicle inward. The end of the first vertical part 6*b* bent at the right angles with the first horizontal part 6*a* extends in the radially inward direction. The end of the second horizontal part 6*c* bent at the right angles with the first vertical part 6*b* extends in the vehicle inward direction (direction where the armature element 14 presses the pressing element 15). The end of the second vertical part 6*d* bent at the right angles with the second horizontal part 6*c* extends in the radially outward direction and is situated inside the peripheral surface 12*c* of the exciting coil 12. The output terminal 7 also includes like the input terminal 6 a first horizontal part 7*a*, a first vertical part 7*b*, a second horizontal part (a first extension) 7*c* and a second vertical part (a second extension) 7*d*. These input terminal 6 and output terminal 7 are protected by a cover 12*d* made of a resin.

The search coil 13, as shown in FIG. 4A, mainly includes a coil bobbin 13*a* formed like a ring by resins and a coil wiring 13*b* which is closely wound around the coil bobbin 13*a* in a given number of turns. The peripheral surface 13*c* of the search coil 13 is situated inside the lower surface of the cover 12*d* of the exciting coil 12 in the radial direction (radially inside the second horizontal parts 6*c* and 7*c*, see FIG. 4A). Adjacent to the peripheral surface 13*c* of the search coil 13 on the vehicle outward side is prepared a pair of an input terminal (wiring terminal) 8 and an output terminal (wiring terminal) 9 neighboring each other. "The peripheral surface 13*c* of the search coil 13" is defined here as a surface which is situated at the most outward position radially between the peripheral surface of the coil bobbin 13*a* and that formed by the coil wiring 13*b*. One end of the coil wiring 13*b* is connected to the input terminal 8 and the other end of it is connected to the output terminal 9.

The input terminal 8 is made of one bent element so that it has a first horizontal part 8*a*, a first vertical part 8*b*, a second horizontal part (a first extension) 8*c* and a second vertical part (a second extension) 8*d*. One end of the first horizontal part 8*a* is connected to the vehicle outward and radially outward surface of the coil bobbin 13*a* and the other end extends toward the vehicle outward. The end of the first vertical part 8*b* bent at the right angles with the first horizontal part 8*a* extends in the radially outward direction. The end of the second horizontal part 8*c* bent at the right angles with the first vertical part 8*b* extends in the vehicle inward direction (direction where the armature element 14 presses the pressing element 15). The end of the second vertical part 8*d* bent at the right angles with the second horizontal part 8*c* extends in the radially outward direction and is situated radially inside the peripheral surface 12*c* of the exciting coil 12. The output terminal 9 also includes like the input terminal 8 a first horizontal part 9*a*, a first vertical part 9*b*, a second horizontal part (a first extension) 9*c* and a second vertical part (a second extension) 9*d*. These input terminal 8 and output terminal 9 are protected by a cover 13*d* made of a resin.

The armature material 14, as shown in FIG. 2, is a ring-shaped element made of a magnetic material, which is coaxial with the rear drive shafts 5 and is placed opposite to the opening side of the first concave 11*d* of the core element 11. The disposition of the armature element 14 this way produces a closed magnetic path enclosing the exciting coil 12 with the core element 11 and the armature element 14. The periphery portion 14*a* of the armature 14 exceeds the peripheral surface 11*g* of the core element 11 throughout. On the surface of the vehicle inward side of the armature 14 lie two pedestals. One of the pedestals which is located radially outward has the same area as that of the surface 11*j* of the core element 11 and the other which is located radially inward has the same area as that of the surface 11*i* of the core element 11. The section of the armature element 14 is tapered so that the thickness may decrease as it approaches outward radially.

The pressing element 15 is made of such a material as SUS304 of a non-magnetic material and has a cylinder-like shape, as shown in FIGS. 5A and 5B. On the vehicle inward side of the pressing element 15 are formed cutouts 15*a* for avoiding the flanges 11*a* of the core element 11 and other cutouts 15*b* for avoiding the couplers 17 which are coupled to the exciting coil 12 and the search coil 13. On the vehicle inward side of the pressing element 15 are further formed cutouts 15*c*, which are situated opposite to the cutouts 15*b* radially. The six cutouts 15*a*–15*c* are positioned circumferentially at regular intervals. On the inner surface of the vehicle outward side of the pressing element 15 are formed six projections 15*d*, so that they correspond to the six projections 11*h* of the core element 11 (see FIG. 3). As shown in FIG. 2, the vehicle outward side (one end) of the pressing element 15 is fixed to the periphery portion 14*a* of the armature element 14 and the vehicle inward side (the other end) is connected to a pressing plate 16*a* of the multiple dish clutch mechanism 16.

The multiple dish clutch mechanism 16, as shown in FIG. 2, is placed surrounding the planetary gear mechanism 4. The multiple dish clutch mechanism 16 mainly includes outer plates 16*b*, which have a spline-shaped outer periphery that is unrotatably connected to the housing H and inner plates 16*c*, which have a spline-shaped inner periphery that is unrotatably connected to the planetary gear mechanism 4, thereby allowing the multiple dish clutch mechanism 16 to displace in the axial direction of the rear drive shafts 5.

Figure 6:
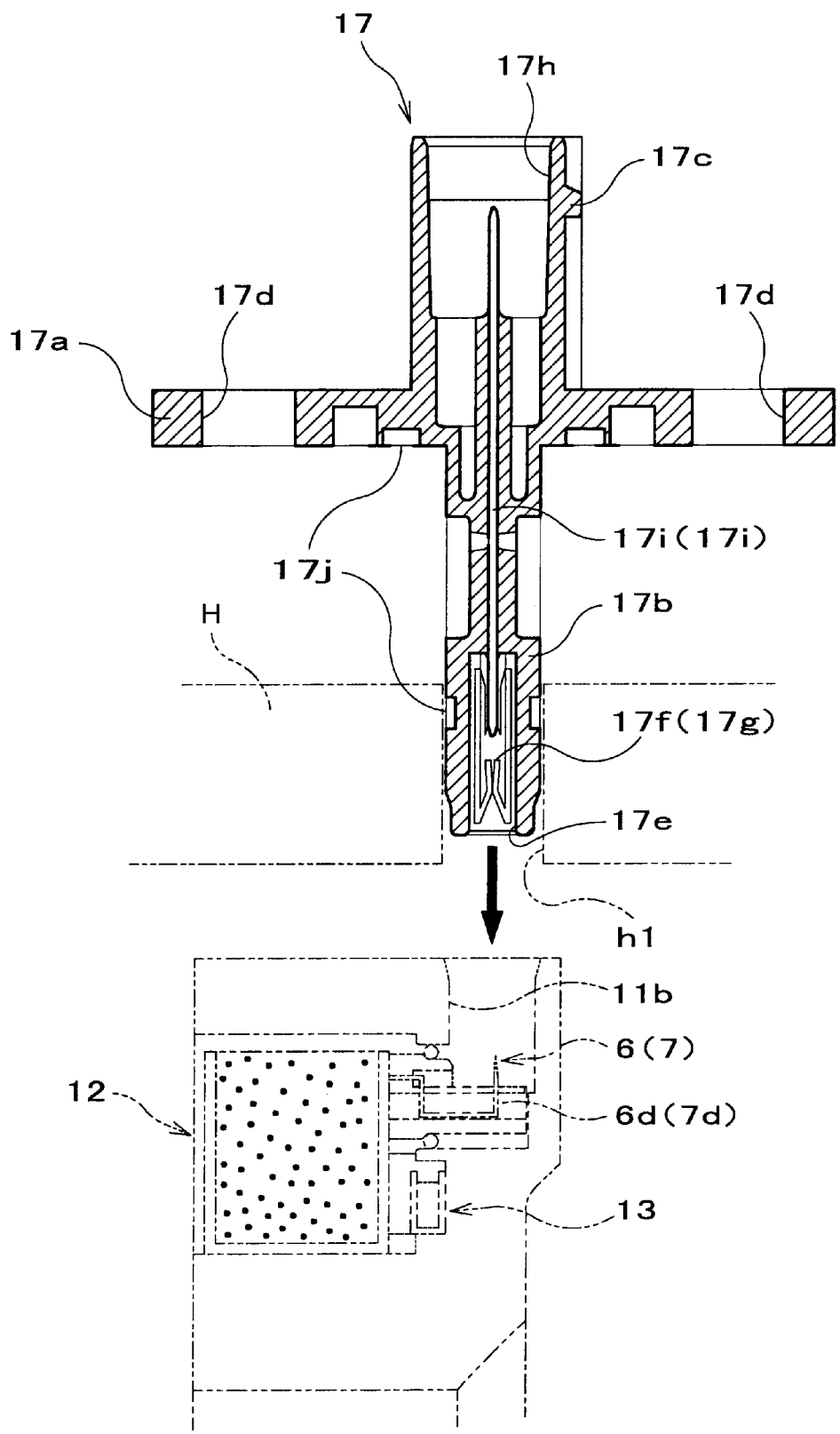
FIG. 6 is a sectional view showing the coupler of the electromagnetic brake according to the present embodiment.

As shown in FIG. 6, each of the couplers 17, which has a cross-shaped section, includes a plate 17a to be in contact with the housing H, a lower projection 17b and an upper projection 17c. A plurality of holes 17d for bolts are made at the desired positions on the plate 17a. An input terminal socket (sending/receiving portion) 17f and an output terminal socket (sending/receiving portion) 17g, through which the electricity flows, are disposed neighboring each other in a concave 17e formed on the base of the lower projection 17b. A connection part 17h for connecting the harness (not shown) from above is formed on the upper projection 17c. In the middle of the coupler 17, two terminals (sending/receiving portion) 17i of stick shapes are provided side by side, which connect the concave 17e of the lower projection 17b and the connection part 17h of the upper projection 17c. The respective ends of the terminals 17i are connected to the input terminal socket 17f and the output terminal socket 17g. Ring-shaped acrylic rubbers 17j (seal elements) are embedded in the preferred positions of the lower surface of the plate 17a near the lower projection 17b and the lower portion of the lower projection 17b, respectively.

The method for assembling the electromagnetic brake 1 and wiring the harness for the exciting coil 12 or the search coil 13 subsequent to the installation of the electromagnetic brake 1 in the housing H.

First as shown in FIG. 4B, a positioning is performed to fit the input terminal 8 and the output terminal 9 of the search coil 13 into the hole 11c of the core element 11. The search coil 13 is inserted axially straight into the second concave 11f of the core element 11. The respective ends of the second vertical parts 8d and 9d of the input terminal 8 and the output terminal 9 are situated facing the outside.

As shown in FIG. 4A, a positioning is performed to fit the input terminal 6 and the output terminal 7 of the exciting coil 12 into the hole 11b of the core element 11. The exciting coil 12 is inserted axially straight into the first concave 11d of the core element 11. The respective ends of the second vertical parts 6d and 7d of the input terminal 6 and the output terminal 7 are situated facing the outside.

Figure 5:
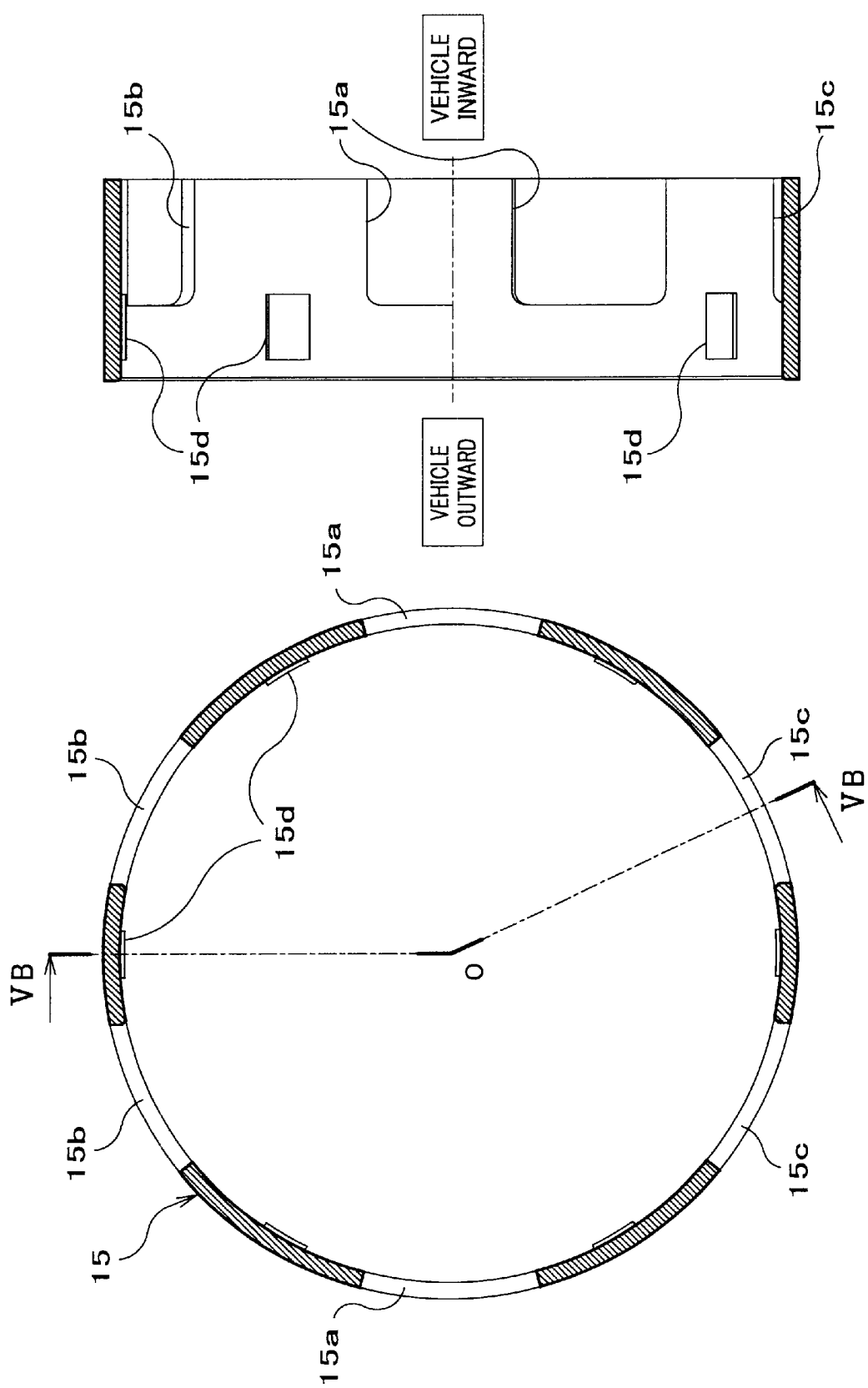
FIG. 5A is a front view showing the pressing element of the electromagnetic brake according to the present embodiment.
FIG. 5B is a sectional view taken along the line VB—VB in FIG. 5A showing the electromagnetic brake.

The pressing element 15 is mated around the core element 11 allowing displacement in the right-left direction of the vehicle (pressing direction) so that the flanges 11a of the core element 11 (see FIG. 3) fit into the cutouts 15a of the pressing element 15 (see FIG. 5). The projections 11h of the core element 11 are in contact with the projections 15d of the pressing element 15. As shown in FIG. 2, the armature element 14 and the pressing plate 16a are fixed to the pressing element 15.

The electromagnetic brake thus assembled is installed in the housing H, which is at least partially filled with the lubricant. The holes 11b and 11c of the core element 11 and the holes h1 and h2 of the housing H are aligned (see FIG. 3) since the flanges 11a are secured to the predetermined positions of the housing H with bolts B. The ends of the second vertical parts 6d and 7d of the input and output terminals 6 and 7 of the exciting coil 12 as well as the ends of the second vertical parts 8d and 9d of the input and output terminals 8 and 9 of the search coil 13 are situated facing the outside (see FIG. 4).

As shown in FIG. 6, the lower projection 17b of the first coupler 17 for the exciting coil is inserted into the hole h1 made on the upper half of the housing H until the bottom end of the lower projection 17b reaches a predetermined position within the hole 11b of the core element 11. Namely, the lower projection 17b of the first coupler 17 is inserted into holes hi and 11b until the lower surface of the plate 17a of the first coupler 17 comes into contact with the outer surface of the housing H. Inserting the lower projection 17b of the first coupler 17 into the holes h1 and 11b, the second vertical part 6d of the input terminal 6 of the exciting coil 12 is connected to the input terminal socket 17f of the lower projection 17b and the second vertical part 7d of the output terminal 7 is connected to the output terminal socket 17g. On the other hand, inserting the second coupler 17 for the search coil 13 into the hole h2 of the housing H, the second vertical parts 8d and 9d of the input and output terminals 8 and 9 of the search coil 13 are connected to the input and output terminal sockets 17f and 17g of the second coupler 17, respectively.

Connecting the harness, which is connected to an external power source such as a battery (not shown), to each of the terminals 17i exposed in the connection part 17h of the first coupler 17 which is connected to the input and output terminals 6 and 7 of the exciting coil 12, the electricity is supplied to the exciting coil 12. On the other hand, connecting the harness, which is connected to a magnetic force detector composed of such as a current detector (not shown), to each of the terminals 17i exposed in the connection part 17h of the second coupler 17 which is connected to the input and output terminals 8 and 9 of the search coil 13, thereby the current induced by the search coil 13 is transmitted to the magnetic force detector.

The present embodiment will provide the following benefits.

(1) Only fixing the core element 11, in which the exciting coil 12 and the search coil 13 are installed, in the housing H and inserting the couplers 17 into the holes hi and h2 of the housing H, the electricity of the external power source can be supplied to the exciting coil 12 and the current induced by the search coil 13 can be transmitted to the magnetic force detector. The conventionally required operation of guiding the harness through the harness hole can be obviated, which allows the operation of installing the exciting coil in the core element and fixing the core element in the housing to be performed more easily.

(2) The input and output terminals 6–9 can avoid the interference with the core element 11 since each of the terminal 6–9 ends lies radially inside the periphery surface 12c of the exciting coil 12, when the exciting coil 12 and the search coil 13 are installed into the core element 11. It is therefore not required to machine the magnetic path of the core element 11 and thereby the magnetic force generated by the surface 11i and that generated by the surface 11j are controlled to be the same.

(3) The periphery surface 13c of the search coil 13 lies radially inside the cover 12d of the exciting coil 12. The holes 11b and 11c of the core element 11 are offset circumferentially. Therefore, the search coil 13 can be disposed near the exciting coil 12 since the interference can be avoided among the input and output terminals 6–9. It will result in the accurate detection of the magnetic flux of the exciting coil 12.

(4) The holes 11b and 11c of the core element 11 and the holes h1 and h2 of the housing H are all located on the upper half side of the housing H. Since each of the couplers 17 is equipped with the acrylic rubbers 17j, the leak of the lubricant in the housing H can thus be prevented securely. Inserting each of the couplers 17 from above the housing H allows the operation of installing each of the couplers 17 into the housing H to be performed more easily.

(5) The pressing element 15 has the cutouts 15a–15c which are placed at regular intervals circumferentially, thereby allowing the well-balanced axial displacement of the pressing element 15.

(6) The radial positioning of the armature element 14 and the core element 11 can be done accurately by mating the pressing element 15 around the core element 11 since the armature element 14 is secured to the cylindrical pressing element 15. This fixation of the armature 14 and the pressing element 15 will also prevent the armature element 14 from falling. The gap (air gap) between the armature element 14 and the core element 11 can be controlled to be uniform radially and thereby the accurate control of the engagement force of the electromagnetic brake 1 can be performed.

(7) The flanges 11a of the core element 11 allow the accurate positioning of the core element 11 in both radial and axial directions relative to the housing H. The cutouts 15a–15c of the pressing element 15 enable the easier assembly since the core element 11, the pressing element 15 and the armature element 14 are integrally fastened in the housing H.

(8) The surfaces 11i and 11j of the core element 11 have the same area and the armature element 14 has the corresponding portions of the same area. The same magnetic flux thus travels through each of the magnetic paths, which lie radially inward and outward the core element 11 across the exciting coil 12. The magnetic flux traveling through the armature element 14 will be uniform since the armature element 14 is tapered so that its thickness decreases progressively from inward to outward radially. The resultant uniform flux will prevent the armature element 14 from falling and control the engagement force of the electromagnetic brake 1 accurately.

(9) When the pressing element 15 displaces axially, the friction generated between the core element 11 and the pressing element 15 can be reduced since the projections 11h of the core element 11 and the projections 15d of the pressing element 15 are slidably in contact each other. Machining is not required for all the inner surface of the pressing element 15 or all the outer surface of the core element 11 in order that the former is mated around the latter. All required is to machine each of the projections 15d and the projections 11h, thereby enabling the easier machining of the pressing element 15 and the core element 11.

(10) Since the pressing element 15 is situated around the core element 11, the pressing element 15 can press the middle of the plurality of the outer plates 16b and the plurality of the inner plates 16c in case the multiple dish clutch mechanism 16 is situated around the planetary gear mechanism 4. The direction of the force transmitted to the multiple dish clutch mechanism 16 from the armature element 14 can be controlled to be straight since the cylindrical pressing element 15 displaces in its axial direction. The pressing element 15 can thus be immune to bending deformation, thereby enabling the accurate control of the engagement force of the electromagnetic brake 1.

(11) Since the holes 11b and 11c are made on the core element 11 on the opposite side of the opening of the first concave 11d and don't require machining of the surfaces 11i and 11j of the core element 11, the uniform magnetization of the armature element 14 can be attained.

It will now be appreciated from the foregoing descriptions that the present invention is not limited to the particularly illustrated embodiment discussed above and may be carried out in various modified forms.

The position of the first coupler 17 of the exciting coil 12 and that of the second coupler 17 of the search coil 13 are arbitrarily selected, however it is preferred that the first coupler 17 should be placed higher than the second coupler 17. Placing the first coupler 17 of the exciting coil 12 this way, it will be protected from the flying stones securely while a vehicle is driving. The stable electricity is thus supplied to the exciting coil 12 reliably and the dependable ON-OFF switching of the multiple dish clutch mechanism 16 will be performed.

In the present embodiment an acrylic rubber 17j is used as a seal material, though other materials such as silicone rubber and nitril rubber may be selected alternatively not limiting to acrylic rubber.

In the present embodiment the electromagnetic friction connecting apparatus is applied to the electromagnetic brake 1 of the rear differential unit M for a four-wheel-drive vehicle based upon a front-engine-front-drive (FF) vehicle. However, the present invention can be applied, for example, to the front-wheel differential unit for driving the right and left wheels of an FF vehicle adjustably and an electromagnetic clutch such as a transmission apparatus which amplifies and transmits the engine driving power to the rear wheel differential unit of a four-wheel-drive vehicle.

In the present embodiment the input and output terminals 6–9 are selected as wiring terminals, though it is not limited to the shapes of the input and output terminals 6–9. Any shape of a terminal is acceptable as long as it has the first extension extending in the direction of the armature element 14 to press the pressing element 15 and the second extension extending from the end of the first extension radially outward. The shape according to the present embodiment enables the easier connection of the coil harness 12b of the exciting coil 12 to the input terminal 6, since the first horizontal part 6a of the input terminal 6 can be installed near the periphery surface 12c of the exciting coil 12.

It goes without saying that the shapes and the materials of the parts such as wiring terminals and couplers of the present embodiment can be modified as required.

What is claimed is:

1. An electromagnetic friction connecting apparatus comprising:

a core element which is formed into a ring shape with a U-shaped section and secured within a housing;

at least one of an exciting coil and a search coil having ring-like shapes, which is situated within a concave of the U-shaped cross section of said core element;

an armature element having a ring-like shape, which is disposed opposite to an opening side of said concave of the U-shaped cross section of said core element;

a pressing element which is actuated by said armature element; and a multiple dish clutch mechanism on which said pressing element exerts connecting force, wherein a plurality of wiring terminals, each of said wiring terminals including a first extension, which extends in a direction of said armature element to press said pressing element, and a second extension, which extends outward radially from an end of said first extension, are provided in at least one of said exciting coil and said search coil, wherein an end of said second extension of said wiring terminal is situated radially inside a peripheral surface of said exciting coil, wherein a plurality of connection openings, each of which allows the end of said second extension of said wiring terminal of at least one of said exciting coil and said search coil to be exposed to an outside of said housing, are formed on said core element and said housing, and wherein a plurality of couplers, each of which has an electrical sending and receiving portion, are inserted into said openings to couple to the end of said second extension of said wiring terminal.

2. An electromagnetic friction connecting apparatus according to claim 1 wherein said search coil is disposed so that a peripheral surface of said search coil is situated radially inside said first extension of said wiring terminal of said exciting coil, and said openings of said exciting coil and said search coil which are made on said core element and said housing are offset circumferentially.

3. An electromagnetic friction connecting apparatus according to claim 1 wherein said housing is filled with a lubricant partially at least, seal elements of leak protection for said lubricant are provided for each of said couplers and at least one of said connection openings for said exciting coil and said search coil is made in an upper half of said housing.

4. An electromagnetic friction connecting apparatus according to claim 2 wherein said housing is filled with a lubricant partially at least, seal elements of leak protection for said lubricant are provided for each of said couplers and at least one of said connection openings for said exciting coil and said search coil is made in an upper half of said housing.

5. An electromagnetic friction connecting apparatus according to claim 1, wherein a peripheral portion of said armature element is so configured that a diameter of said peripheral portion is larger than an outer diameter of said core element, wherein said pressing element is formed cylindrically and one end of said pressing element is secured to said peripheral portion and the other end is coupled to a pressing plate of said clutch mechanism, wherein said pressing element is mated around said core element displaceably in a pressing direction, wherein said core element includes flanges located at a periphery thereof for fixing said core element to said housing, wherein a first plurality of cutouts for avoiding said flanges and a second plurality of cutouts for avoiding said couplers for at least one of said exciting coil and said search coil are provided on said pressing element, and wherein all said cutouts are positioned evenly in a circumferential direction.

6. An electromagnetic friction connecting apparatus according to claim 2, wherein a peripheral portion of said armature element is so configured that a diameter of said peripheral portion is larger than an outer diameter of said core element, wherein said pressing element is formed cylindrically and one end of said pressing element is secured to said peripheral portion and the other end is coupled to a pressing plate of said clutch mechanism, wherein said pressing element is mated around said core element displaceably in a pressing direction, wherein said core element includes flanges located at a periphery thereof for fixing said core element to said housing, wherein a first plurality of cutouts for avoiding said flanges and a second plurality of cutouts for avoiding said couplers for at least one of said exciting coil and said search coil are provided on said pressing element, and wherein all said cutouts are positioned evenly in a circumferential direction.

7. An electromagnetic friction connecting apparatus according to claim 3, wherein a peripheral portion of said armature element is so configured that a diameter of said peripheral portion is larger than an outer diameter of said core element, wherein said pressing element is formed cylindrically and one end of said pressing element is secured to said peripheral portion and the other end is coupled to a pressing plate of said clutch mechanism, wherein said pressing element is mated around said core element displaceably in a pressing direction, wherein said core element includes flanges located at a periphery thereof for fixing said core element to said housing, wherein a first plurality of cutouts for avoiding said flanges and a second plurality of cutouts for avoiding said couplers for at least one of said exciting coil and said search coil are provided on said pressing element, and wherein all said cutouts are positioned evenly in a circumferential direction.

8. An electromagnetic friction connecting apparatus according to claim 4, wherein a peripheral portion of said armature element is so configured that a diameter of said peripheral portion is larger than an outer diameter of said core element, wherein said pressing element is formed cylindrically and one end of said pressing element is secured to said peripheral portion and the other end is coupled to a pressing plate of said clutch mechanism, wherein said pressing element is mated around said core element displaceably in a pressing direction, wherein said core element includes flanges located at a periphery thereof for fixing said core element to said housing, wherein a first plurality of cutouts for avoiding said flanges and a second plurality of cutouts for avoiding said couplers for at least one of said exciting coil and said search coil are provided on said pressing element, and wherein all said cutouts are positioned evenly in a circumferential direction.

* * * * *